United States Patent [19]
Tabata

[11] Patent Number: 5,581,076
[45] Date of Patent: Dec. 3, 1996

[54] CONTACT TYPE IMAGE SENSOR WITH MORE-UNIFIED CONSTRUCTION

[75] Inventor: Masami Tabata, Isehara, Japan

[73] Assignee: Canon Kabushiki Kaisha, Tokyo, Japan

[21] Appl. No.: 323,112

[22] Filed: Oct. 14, 1994

[30] Foreign Application Priority Data

Oct. 14, 1993 [JP] Japan .................................. 5-280299

[51] Int. Cl.$^6$ ...................................................... H04N 1/28
[52] U.S. Cl. ........................ 250/208.1; 250/239; 358/484
[58] Field of Search ................................. 250/208.1, 216, 250/239; 358/471, 482–484, 493, 494

[56] References Cited

U.S. PATENT DOCUMENTS

| | | | |
|---|---|---|---|
| 4,723,129 | 2/1988 | Endo et al. | 346/1.1 |
| 4,740,796 | 4/1988 | Endo et al. | 346/1.1 |
| 4,908,718 | 3/1990 | Shimada | 358/494 |
| 5,079,190 | 1/1992 | Mihara | 437/220 |
| 5,101,285 | 3/1992 | Kawai et al. | 358/471 |
| 5,187,595 | 2/1993 | Kitani et al. | 358/482 |
| 5,196,691 | 3/1993 | Kitani et al. | 250/208.1 |
| 5,214,273 | 5/1993 | Yokochi | 358/484 |
| 5,254,847 | 10/1993 | Hata et al. | 250/208.1 |
| 5,281,803 | 1/1994 | Ishizuka | 250/208.1 |
| 5,399,850 | 3/1995 | Nagatani et al. | 358/208.1 |

FOREIGN PATENT DOCUMENTS

| | | |
|---|---|---|
| 0508709 | 10/1992 | European Pat. Off. . |
| 0520430 | 12/1992 | European Pat. Off. . |
| 0554825 | 8/1993 | European Pat. Off. . |

*Primary Examiner*—Stephone Allen
*Attorney, Agent, or Firm*—Fitzpatrick, Cella, Harper & Scinto

[57] ABSTRACT

A contactless image sensor comprises a light source for irradiating the light onto an original, photoelectric converting elements for photoelectrically converting the light from the original, an image pickup device for guiding the light from the original to the photoelectric converting elements, and a frame body for holding them. The frame body includes a light transmitting portion and a light non-transmitting portion, which are integrally pressing-out molded plastics. That is, the optical path portion and the optical guide of the frame body are made of transparent plastics and the other portions of the frame body are made of colored plastics having a light shielding performance.

7 Claims, 5 Drawing Sheets

MOLDING OF PRESSING OUT TWO COLORS INTEGRALLY

CONTACT TYPE IMAGE SENSOR WITH MORE-UNIFIED CONSTRUCTION

BACKGROUND OF THE INVENTION

1. Field of the Invention

The present invention relates to a contact type image sensor and, more particularly, to a contact type image sensor having a frame body to hold a light source to irradiate light onto an original, photoelectric converting elements for photoelectrically converting the light from the original, and an image pickup device for guiding the light from the original to an array of the photoelectric converting elements.

2. Related Background Art

Hitherto, as shown in a cross-sectional view in FIG. 7, a contact type image sensor has been constructed in a manner such that the sensor array 8 corresponding to a length of an original to be read, a point light source array 1 in which a plurality of point light sources 2 for irradiating the original surface are arranged in a line on a board, an image pickup device array 7 to form an image of the light from the original onto a light receiving portion of photoelectric converting elements 9 on the sensor array 8, and a cover glass 11 to support the original are positioned and fixed to one frame body 10.

As a point light source array 1, LED elements are generally used, with a view to low electric power consumption and a long life. The LED elements are attached in a line on a board made of a material such as glass epoxy or the like together with resisters for current limitation by soldering or the like.

However, in the above conventional contact type image sensor, there are the following problems.

(1) That is, in the above conventional sensor, since the cover glass 11 and the frame body 10 are separate and individual parts, they increase costs, because of the number of parts and because of a process for adhering the cover glass 11 to the frame body 10 in order to position and fix the cover glass is needed and the like.

(2) It is difficult to completely eliminate a height difference between the cover glass 11 and the framing body 10, in terms of precision. Therefore, in the case of a reading apparatus of a sheet-through type, in order to prevent the original colliding with the portion of different height portion, it is necessary to take a countermeasure such that a Mylar® sheet is adhered to the portion of height different or the like, so that it also causes an increase in costs.

(3) There is also a technical point to be noted. A solder ball formed at the time when the LED elements of the LED array are soldered, or foreign matter such as a board scrap from an LED board cut surface or the like, adhered to the light source is moved into the optical path of a rear surface of the cover glass 11, thereby shielding or reflecting the light from the light source 2 onto an original reading line or the light from the original reading line to the image pickup device, so that erroneous information is picked up by the sensor and appears as a black stripe or a white stripe in an output image.

SUMMARY OF THE INVENTION

It is an object of the invention to provide a contact type image sensor which can solve the technical problems as mentioned above by paying an attention to them.

It is one aspect of the invention to provide a contact type image sensor having a light source to irradiate a light onto an original, photoelectric converting elements to photoelectrically convert the light from the original, and a frame body to hold them, wherein the frame body includes a light transmission portion and a light-non-transmission portion and they are made of plastics which were integrally pressing-out molded (this term used throughout the disclosure to denote a process such as that disclosed in FIG. 4 and the corresponding description).

According to the invention, there is provided a contact type image sensor in which a part of a frame body to hold a light source to irradiate light onto an original, photoelectric converting elements to photoelectrically convert the light from the original, and an image pickup device to guide the light from the original to the photoelectric converting elements is used as an original supporting body and at least a part of the original supporting body is constructed by a light transmitting material, wherein the frame body is made of plastics which were integrally pressing-out molded.

According to the invention, a part of the frame body for holding the light source, photoelectric converting elements, and image pickup device which are component elements of the contact type image sensor is used as an original supporting body, at least a part of the original supporting body is constructed by a light transmitting material, and the frame body is integrally pressing-out molded by plastics, so that the number of parts of the contact type image sensor is reduced and a height difference between the original supporting body and the frame body is eliminated. Further, so long as an optical guide to guide the light of the light source to the original is integrally pressing-out molded by transparent plastics, the light source can be isolated, thereby making it possible to prevent foreign matter dropped from the light source obstructing the optical axis.

DETAILED DESCRIPTION OF THE PREFERRED EMBODIMENTS

The preferred embodiments of the invention will now be described hereinbelow. However, the present invention is not limited to those embodiments but can be applied to any embodiments so long as they accomplish the objects of the invention. Therefore, the present invention includes a construction in which each component element is substituted for by an equivalent or alternative element.

Figure 1:
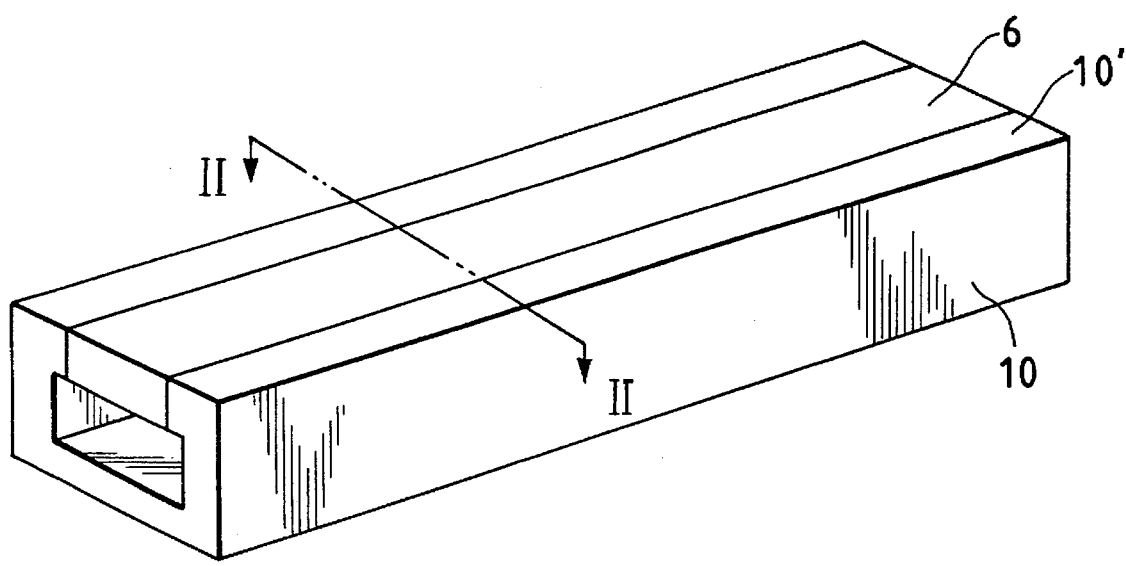
FIG. 1 is a perspective view showing an external view of a contact type image sensor according to an embodiment of the invention.

FIG. 1 is a perspective view showing an external view of a contact type image sensor according an embodiment of the invention.

Reference numeral 10 denotes a frame body of the contact type image sensor. The frame body has a colored portion 10' and a transparent portion (window portion) 6.

A sensor array as photoelectric converting elements is ordinarily arranged at a predetermined position of the frame body 10 and fixed.

A light source, an optical guide, an image pickup device, and the like are arranged on the frame body 10 as necessary.

The present invention is characterized by the frame body 10 being made of molded plastics (molded resin).

Specific embodiments will now be described with reference to a cross-sectional view which is seen from the same direction as that of a cross-sectional view taken along the line II—II in FIG. 1.

Figure 2:
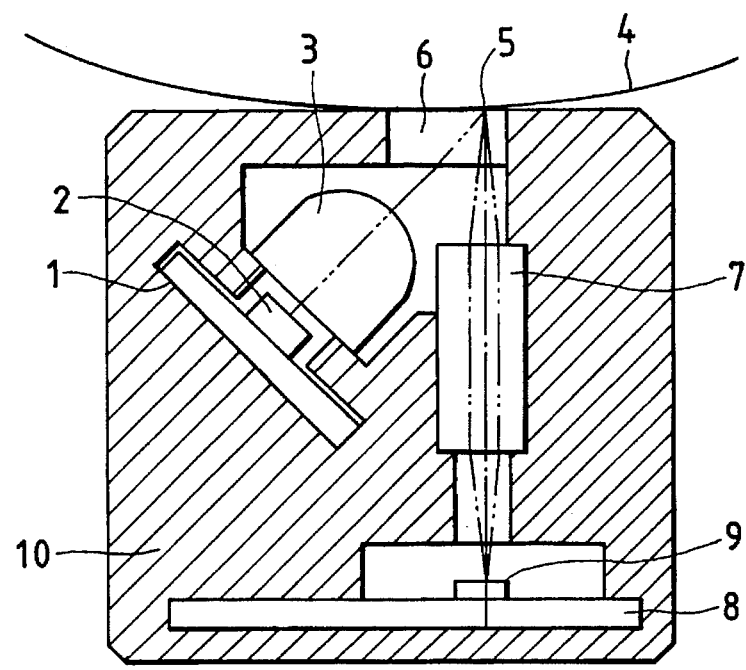
FIG. 2 is a cross-sectional view of a contact type image sensor according to an embodiment 1 of the invention.

FIG. 2 is a cross-sectional view showing the first embodiment of a contact type image sensor of the invention. In the diagram, reference numeral 1 indicates an LED array as a light source to illuminate an original. The LED array is constructed by attaching a number of LED chips 2 in a line by soldering in correspondence to the original. Reference numeral 3 denotes an optical guide to effectively guide a light from the LED array 1 to a line 5 of an original 4; 6 the window portion (which is a part of the frame body 10) made of plastics having a light transmission performance; 7 the lens array as an image pickup device to form an image of optical information on the original surface; 8 the sensor array which is constructed by arranging the photoelectric converting elements 9 to convert the light information formed as an image by the lens array 7 to the electric signal in correspondence to the length of original to be read; and 10 the frame body to slide and insert the LED array 1, lens array 7, and sensor array 8 from the lateral direction (in the direction perpendicular to the paper surface), thereby positioning and fixing them.

The frame body 10 including the window portion 6 and the optical guide 3 are integrally formed by a method of a pressing-out two-color molding using a plastics material. The window portion 6 and the optical guide 3 are made of a transparent plastics material and the other portions (hatched portions in the diagram) are made of a black plastics material which can easily absorb the light. Although the optical guide 3 is integrally formed with the frame body 10, the optical guide 3 can be also separately formed and inserted into the frame body 10.

Figure 3:
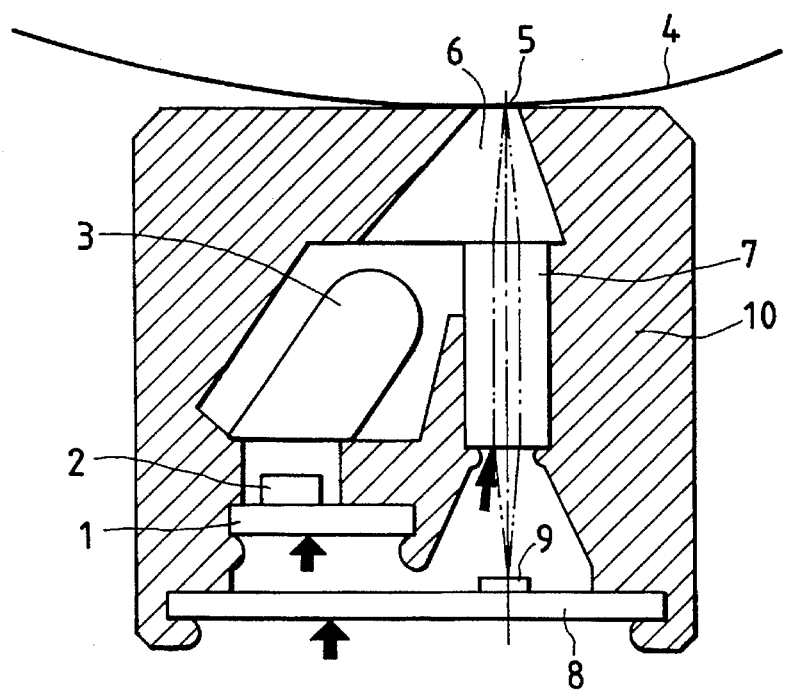
FIG. 3 is a cross-sectional view of a contact type image sensor according to an embodiment 2 of the invention.

FIG. 3 is a cross-sectional view showing the second embodiment of a contact type image sensor of the invention. As shown in FIG. 3, in a manner similar to the first embodiment, the optical guide 3 and the window portion 6 are integrally pressing-out molded by using transparent plastics and the portions except the window portion 6 of the frame body 10 are integrally pressing-out molded by using black plastics. As a method of attaching the parts, the lens array 7 as an image pickup device is brought into contact with the window portion 6 in the direction of an arrow from the side opposite to the window portion 6 of the frame body 10 and is fitted into the frame body 10. Further, the LED array 1 and the sensor array 8 are inserted into the frame body 10 from the lower side and are fixed in a manner similar to the above processes. The window portion 6 is narrowed like a tapered shape toward the original side in order to prevent information of portions other than the line 5 of the original 4 becoming stray light and causing erroneous information in the sensor output. Since they are pressing-out molded, the optical guide 3 and the window portion 6 can be also easily integrally molded.

A pressing-out molding method for forming the frame body which is used in the invention will now be described.

Figure 4:
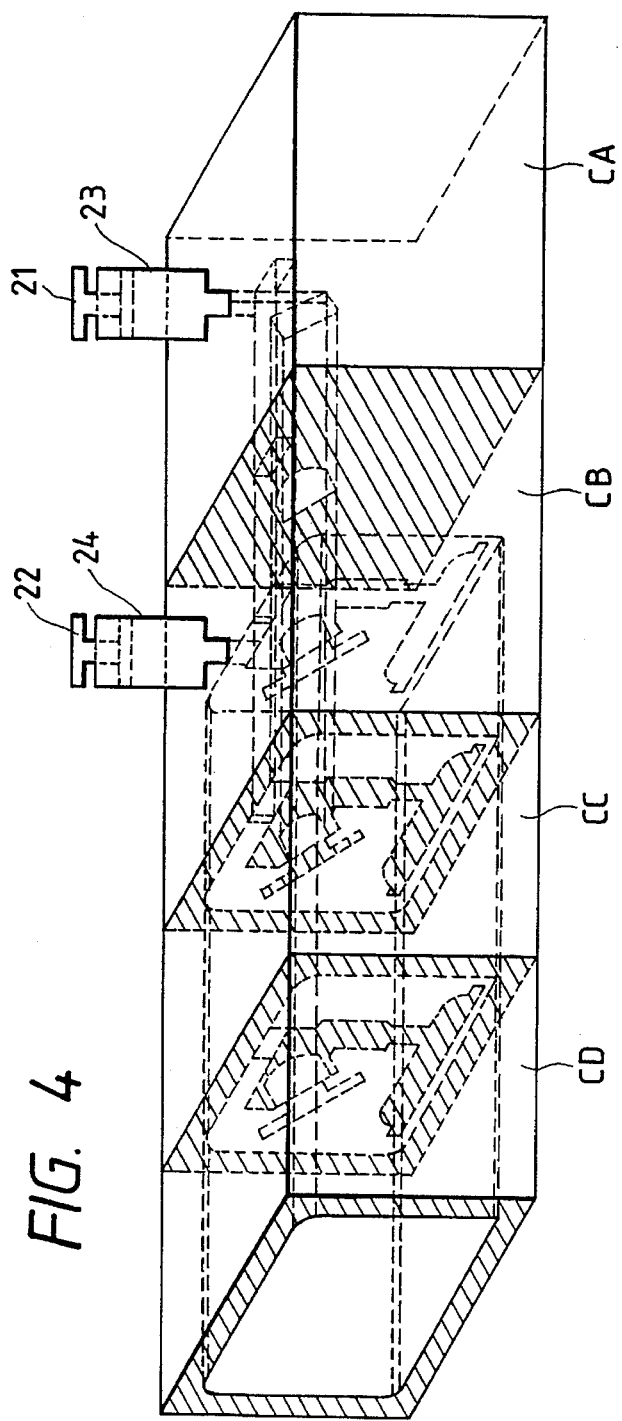
FIG. 4 is a schematic diagram showing an example of a forming apparatus for forming a frame body which is used in the invention.

FIG. 4 is a schematic diagram showing a pressing-out molding apparatus. The frame body 10 as shown in FIG. 5 can be formed by such an apparatus.

The apparatus is mainly constructed by four dies CA, CB, CC, and CD. The die CA has a cavity to mold the window portion 6 and the optical guide 3. An injector having a piston 21, and a cylinder (tank) 23 to inject transparent plastics is provided for the cavity.

Figure 5:
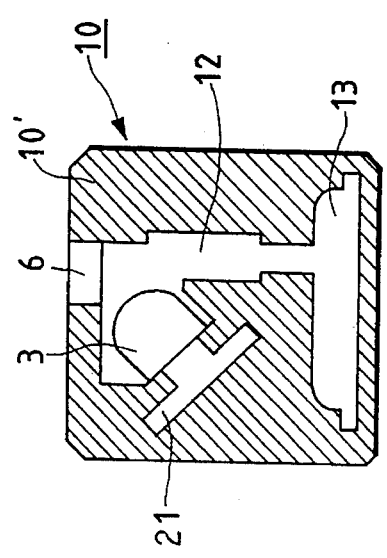
FIG. 5 is a cross-sectional view of the frame body.

The die CB is adjacent to the die CA and has a cavity to mold the hatched portion 10' in FIG. 5. An injector including a piston 22 and cylinder (tank) 24 to inject colored plastics is provided for the cavity.

The die CC is adjacent to the die CB and is used to adhere the transparent plastics serving as an optical guide 3 which was molded by the die CA and passed through the die CB to the colored portion 10' made of colored plastics.

The die CD is adjacent to the die CC. In the die CD, the transparent plastics serving as a window portion 6 and the colored portion 10' are adhered.

As mentioned above, the transparent plastics and the colored plastics are integrally pressing-out molded, thereby forming the frame body 10.

The electric converting elements are inserted into a hollow portion 13 of the frame body 10, the image pickup device is inserted into a hollow portion 12, and the light source is inserted into a hollow portion 21. Both sides in the longitudinal direction of the frame body (the direction perpendicular to the paper surface), namely, the inserting surfaces to which the photoelectric converting elements, image pickup device, and light source are inserted, are capped by side plates, so that the contact type image sensor is completed.

As plastics which are used in the invention, a natural resin or a synthetic resin of an organic high molecular substance is used.

Thermoplastic resin or thermosetting resin can be used.

Specifically, polyvinyl chloride, polyethylene, polystyrene, polycarbonate, phenol resin, urea resin, epoxy resin, melamine resin, or the like can be used.

It is particularly desirable to use polycarbonate from viewpoints of mechanical intensity, easiness of coloring, degree of transparency if no coloring is added, stability of dimensions, and the like in the molded product.

More preferably, a conductive material is mixed into the colored plastics, thereby providing a conductivity.

In the case of providing such conductivity, the frame body is held to a predetermined reference potential (for example, 0 potential), thereby making it possible to prevent problems due to static electricity from friction with the original.

In the foregoing embodiments, the frame body is integrally formed by the pressing-out molding by the apparatus in FIG. 4 using transparent polycarbonate and polycarbonate containing a black pigment and conductive carbon.

Figure 6:
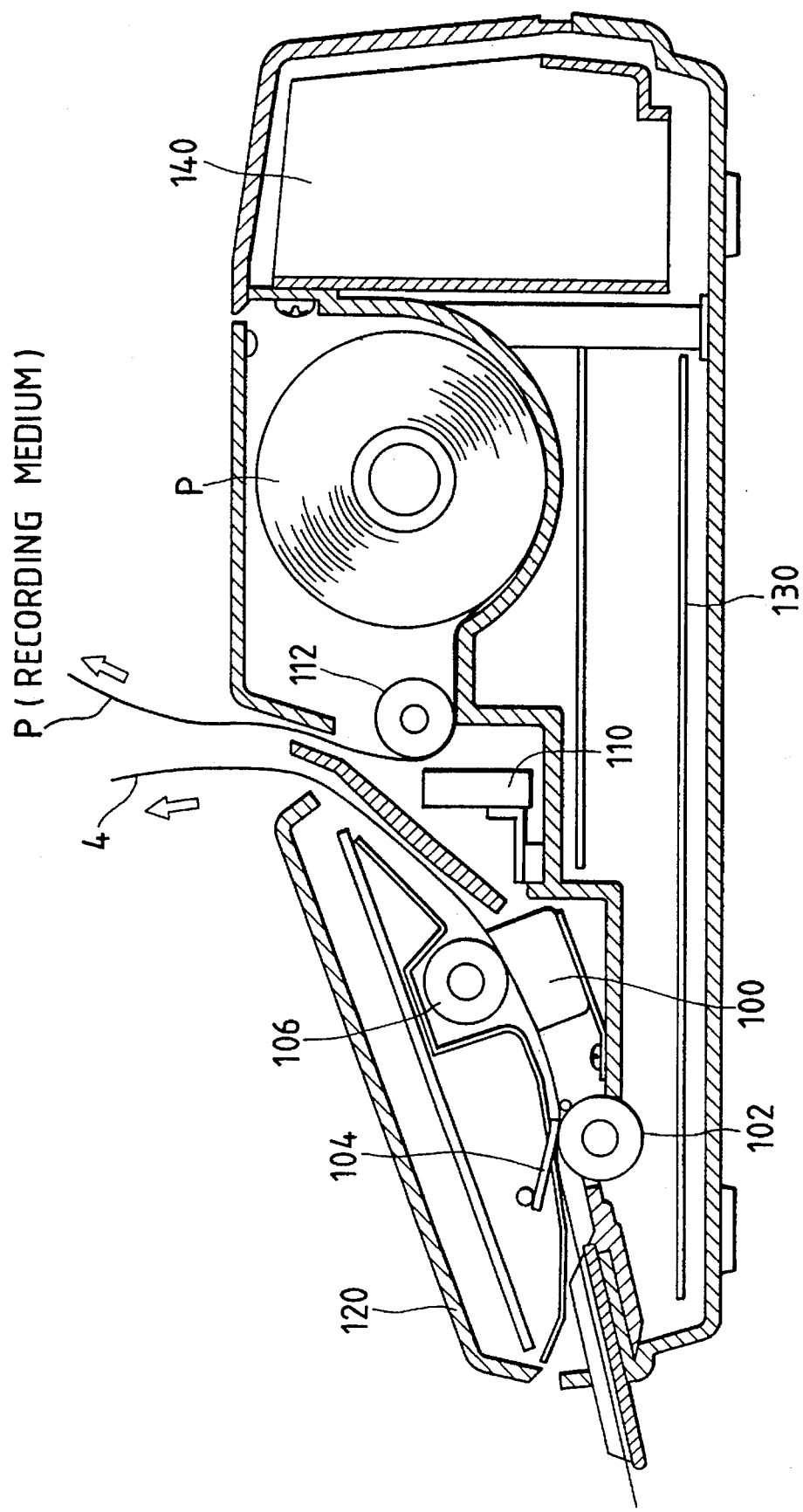
FIG. 6 is a schematic constructional diagram showing an example of a facsimile machine having a communicating function as an image information processing apparatus constructed by using the contact type image sensor of the invention.
Figure 7:
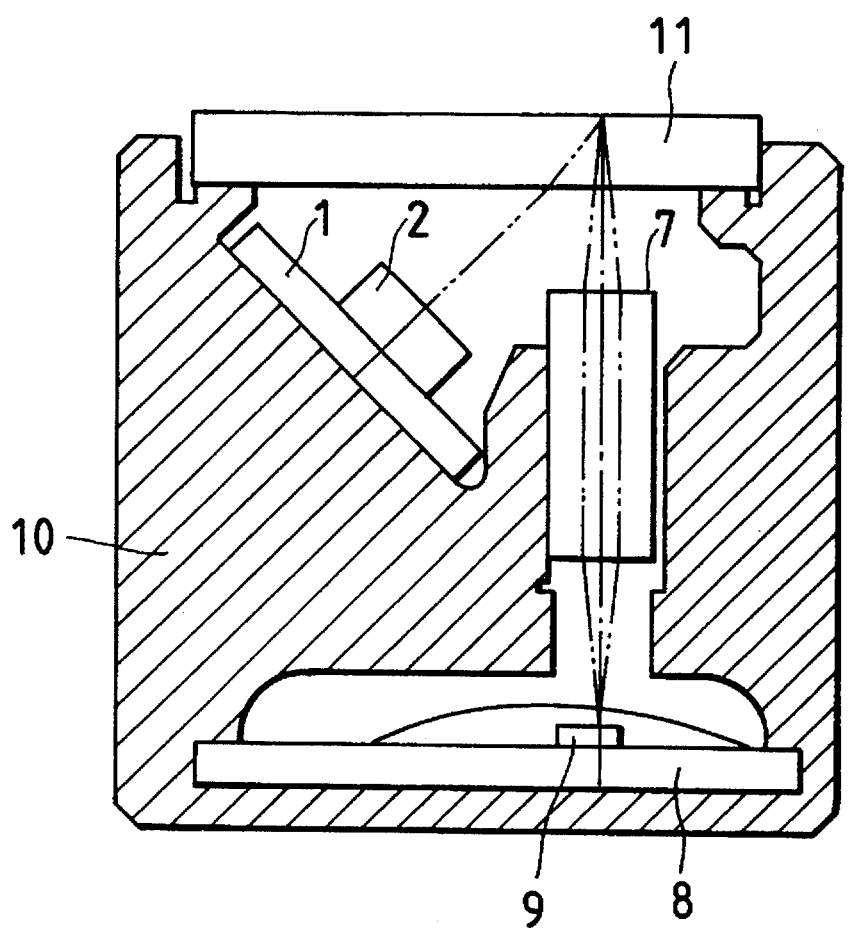
FIG. 7 is a cross-sectional view of a conventional contact type image sensor.

FIG. 6 is a schematic constructional diagram showing an example of a facsimile machine having a communicating function as an image information processing apparatus constructed by using the above contact type image sensor.

In the diagram, reference numeral 102 denotes a feed roller as feeding means for feeding the original 4 toward the reading position; 104 a separating member for reliably separating and feeding the original sheets one by one; and 106 a platen roller as conveying means which is attached at the reading position for a sensor unit 100 and is used for restricting the surface of the original 4 to be read and for conveying the original 4.

In the case where a frame body of the sensor unit 100 is conductive, the frame body is held at a predetermined potential by connecting with a ground potential of the apparatus.

P indicates a recording medium having a shape like a roll paper in the example shown in the diagram. In the case of image information read out by the sensor unit 100, a facsimile apparatus, or the like, the image information transmitted from the outside is reproduced on a recording paper which was taken out. Reference numeral 110 denotes a recording head as recording means for performing the image formation, and various kinds of recording heads such as thermal head, inkjet recording head, and the like can be used. A serial type or a line type can be also used as a recording head. Reference numeral 112 denotes a platen roller as conveying means for conveying the recording medium P to the recording position by the recording head 110 and for restricting the surface to be recorded.

Reference numeral 120 indicates an operation panel on which switches for accepting an operation input as input/output means, a display section for informing a message and a state of the apparatus, and the like are arranged.

Reference numeral 130 denotes a system control board as control means on which a control section (controller) to control each section, a driving circuit (driver) of the photoelectric converting elements, a processing section (processor) of the image information, a transmitting and receiving section, and the like are provided. Reference numeral 140 denotes a power source of the apparatus.

As recording means which is used in the information processing apparatus using the invention, it is preferable to use the recording means whose representative construction and principle have been disclosed in U.S. Pat. Nos. 4,723,129 and 4,740,796. The above system is effective because at least one driving signal which corresponds to the recording information and gives a rapid temperature increase exceeding a nuclear boiling is supplied to an electrothermal transducer arranged in correspondence to a sheet or a liquid path in which a liquid (ink) is held, whereby producing thermal energy in the electrothermal transducer and causing a film boiling on the thermal operational surface of the recording head, so that a bubble in the liquid (ink) corresponding to the driving signal in a one-to-one corresponding relation is produced. The liquid (ink) is discharged through an opening for discharge by growth or contraction of the bubble, thereby forming at least one liquid droplet.

As a full-line type recording head having a length corresponding to a width of the maximum recording medium which can be recorded by the recording apparatus, either one of the construction which satisfies the length and the construction as one integrally formed recording head can be used by a combination of a plurality of recording heads as disclosed in the above specifications.

In addition, the invention is also effective in the case of using a recording head of the exchangeable chip type in which the electrical connection with the apparatus main body, or the supply of the ink from the apparatus main body can be performed by attaching the head to the apparatus main body or the cartridge type recording head in which an ink tank is integrally provided for the recording head itself.

As mentioned above, according to the invention, by integrally pressing-out molding the frame body by plastics (preferably, the optical path portion of the frame body and the optical guide are molded by a transparent material and the other portions of the frame body are molded by a colored material having the light shielding performance by the integrally pressing-out molding method):

(1) the conventional original supporting plate and frame body are integrally molded, so that the number of parts can be reduced and the costs can be also decreased;

(2) the original supporting plate and the frame body are integrally molded, so that the height different portion between the conventional original supporting plate and frame body can be eliminated, and the usual Mylar® sheet or the like to bury the height different portion for smoothly conveying the original is not needed; and (3) by integrally molding the optical guide, the light of the light source can be efficiently guided to the original, the illuminance on the original surface can be raised, and the invention can be applied to a high speed and high resolution sensor; and since the light source is covered by the optical guide, it is possible to prevent that which is foreign matter which is dropped out from the light source being moved onto the optical path and giving rise to erroneous information.

What is claimed is:

1. A contact type image sensor having a light source for irradiating light onto an original, photoelectric converting elements for photoelectrically converting the light from the original, and a unitary frame body for holding them, wherein said frame body includes a light transmission portion and a light non-transmission portion, and wherein said portions are made of plastics which are molded, and said frame body has a uniform-sectional-area configuration.

2. A sensor according to claim 1, wherein a part of said frame body is used as an original supporting body, and wherein an abrasion resistant coating process is performed onto at least a reading line of a surface of said original supporting body.

3. A sensor according to claim 1, wherein said light transmission portion has a sectional area of rectangular or trapezoidal shape.

4. A sensor according to claim 1, wherein said frame body includes a space accommodating a lens array for guiding light into said photoelectric converting element.

5. A sensor according to claim 1, wherein said frame body has a protruding section for fixing said light source, said photoelectric converting element, or said lens array.

6. An image information processing apparatus comprising:

a sensor according to claim 1; and an original conveying means.

7. An apparatus according to claim 6, further comprising an ink jet recording head.

* * * * *

UNITED STATES PATENT AND TRADEMARK OFFICE
CERTIFICATE OF CORRECTION

PATENT NO. : 5,581,076

DATED : December 3, 1996

INVENTOR(S) : Masami Tabata

It is certified that error appears in the above-identified patent and that said Letters Patent is hereby corrected as shown below:

<u>AT [57] ABSTRACT</u>
  Line 1, "contactless" should read --contact type--.

<u>COLUMN 1</u>
  Line 48, "height different" should read --different height--.
  Line 66, "as" should be deleted.
  Line 67, "above by paying an attention to them." should read --above.--

<u>COLUMN 2</u>
  Line 35, "obstructing" should read --from obstructing--.

<u>COLUMN 5</u>
  Line 46, "whereby" should read --thereby--.

<u>COLUMN 6</u>
  Line 20, "height different" should read --height-different--.
  Line 28, "which" should be deleted.
  Line 29, "is" (both occurrences) and "which" should be deleted.

UNITED STATES PATENT AND TRADEMARK OFFICE
CERTIFICATE OF CORRECTION

PATENT NO. : 5,581,076

DATED : December 3, 1996

INVENTOR(S) : Masami Tabata

It is certified that error appears in the above-identified patent and that said Letters Patent is hereby corrected as shown below:

COLUMN 6
  Line 30, "being" should read --from being--.

Signed and Sealed this

Fifteenth Day of July, 1997

Attest:

BRUCE LEHMAN

Attesting Officer

Commissioner of Patents and Trademarks